US012551738B2

(12) United States Patent
Kieras

(10) Patent No.: US 12,551,738 B2
(45) Date of Patent: Feb. 17, 2026

(54) RETRACTABLE SPOUT CLOSURE SYSTEM WITH FLAME MITIGATION

(71) Applicant: Rieke LLC, Auburn, IN (US)

(72) Inventor: Ronald Kieras, McHenry, OH (US)

(73) Assignee: Rieke LLC, Auburn, IN (US)

( * ) Notice: Subject to any disclaimer, the term of this patent is extended or adjusted under 35 U.S.C. 154(b) by 208 days.

(21) Appl. No.: 18/423,790

(22) Filed: Jan. 26, 2024

(65) Prior Publication Data

US 2024/0165440 A1 May 23, 2024

Related U.S. Application Data

(63) Continuation-in-part of application No. PCT/US2023/020958, filed on May 4, 2023.

(60) Provisional application No. 63/351,965, filed on Jun. 14, 2022, provisional application No. 63/342,211, filed on May 16, 2022, provisional application No. 63/338,257, filed on May 4, 2022.

(51) Int. Cl.
*A62C 3/06* (2006.01)
*A62C 4/00* (2006.01)

(52) U.S. Cl.
CPC ................ *A62C 3/065* (2013.01); *A62C 4/00* (2013.01)

(58) Field of Classification Search
CPC ........ A62C 3/065; A62C 4/00; B65D 25/385; B65D 47/123; B65D 51/20; B65D 2213/00; B65D 2251/0015; B65D 2251/0087; B65D 2401/15; B65D 51/24; B65D 50/046; B65D 47/063; B65D 25/44; B65D 47/103; B65D 47/06; B65D 47/32; F23K 2203/102; F23D 14/82
See application file for complete search history.

(56) References Cited

U.S. PATENT DOCUMENTS

| | | | | |
|---|---|---|---|---|
| 900,763 | A | 10/1908 | Mcnutt | |
| 1,553,395 | A | 9/1925 | Ressler | |
| 1,792,198 | A | 2/1931 | Strindberg | |
| 1,816,323 | A | 7/1931 | Gluck | |
| 2,247,734 | A | 7/1941 | Schreiber | |
| 2,561,596 | A * | 7/1951 | Rieke | B65D 47/063 215/354 |
| 2,565,699 | A | 8/1951 | Rieke | |
| 2,661,128 | A | 12/1953 | Rieke | |

(Continued)

FOREIGN PATENT DOCUMENTS

| | | | |
|---|---|---|---|
| AU | 511081 | B | 6/1979 |
| DE | 149581 | A | 1/1902 |

(Continued)

*Primary Examiner* — Donnell A Long
(74) *Attorney, Agent, or Firm* — McDonald Hopkins LLC

(57) ABSTRACT

Flame mitigation system for retractable/extendible spout formed in a closure is described. The system meets applicable regulatory requirements and includes a flame mitigating mesh element in a rigid spout section immediately above a flexible section that extends and retracts. A tamper evident panel is disposed above the mesh, while a removable cap can be affixed to the rigid spout. An optional, snap-fitting cylindrical guard may also be used. In each instance, the precise positioning of selected elements and inner diameter and axial travel distance of selected elements can be determinative of the system's ability to pass the regulatory requirements.

15 Claims, 7 Drawing Sheets

(56) References Cited

U.S. PATENT DOCUMENTS

| | | | | | |
|---|---|---|---|---|---|
| 2,723,060 | A | | 11/1955 | Rieke | |
| 2,772,037 | A | | 11/1956 | Rieke | |
| 2,774,523 | A | | 12/1956 | Rieke | |
| 2,895,654 | A | | 7/1959 | Rieke | |
| 3,040,938 | A | | 6/1962 | Smith | |
| 3,203,665 | A | | 8/1965 | Grant | |
| 3,327,628 | A | | 6/1967 | Loprest | |
| 3,604,740 | A | * | 9/1971 | Summers | B65D 47/061 292/256.61 |
| 3,613,966 | A | | 10/1971 | Summers | |
| 3,615,965 | A | | 10/1971 | Smith | |
| 3,628,705 | A | | 12/1971 | Rieke | |
| 3,711,259 | A | | 1/1973 | Gurney | |
| 3,804,305 | A | | 4/1974 | Rieke | |
| 4,236,629 | A | * | 12/1980 | Dwinell | B65D 47/10 222/530 |
| 4,294,382 | A | * | 10/1981 | Summers | B65D 47/123 222/541.9 |
| 4,295,583 | A | | 10/1981 | Schurr | |
| 4,320,861 | A | * | 3/1982 | Rieke | B65D 55/0863 222/541.9 |
| 4,328,901 | A | | 5/1982 | Gunderman et al. | |
| 4,413,743 | A | | 11/1983 | Summers | |
| 4,474,314 | A | | 10/1984 | Roggenburg, Jr. | |
| 4,483,461 | A | | 11/1984 | Igarashi | |
| 4,489,860 | A | | 12/1984 | Flider | |
| 4,555,048 | A | | 11/1985 | Hamman et al. | |
| 4,568,006 | A | * | 2/1986 | Mueller | B65D 47/063 222/541.9 |
| 4,618,078 | A | * | 10/1986 | Hamman | B65D 47/103 222/529 |
| 4,632,282 | A | * | 12/1986 | Nagashima | B65D 47/063 222/530 |
| 5,051,103 | A | | 9/1991 | Neuroth | |
| 5,215,312 | A | | 6/1993 | Knappe | |
| 5,641,099 | A | * | 6/1997 | McLelland | B65D 51/20 222/541.9 |
| 5,681,358 | A | * | 10/1997 | Spencer | B65D 47/063 585/14 |
| 5,797,525 | A | | 8/1998 | McLelland | |
| 5,967,376 | A | | 10/1999 | McLelland | |
| 6,237,818 | B1 | | 5/2001 | Kline | |
| 6,378,742 | B1 | | 4/2002 | Rohr | |
| D610,007 | S | | 2/2010 | Baughman | |
| D610,008 | S | | 2/2010 | Baughman | |
| D610,457 | S | | 2/2010 | Baughman | |
| 7,798,378 | B2 | | 9/2010 | Baughman | |
| 7,988,007 | B2 | | 8/2011 | Baughman | |
| 8,292,133 | B2 | | 10/2012 | Baughman | |
| 8,814,004 | B2 | * | 8/2014 | Letica | B65D 47/063 222/153.07 |
| 9,126,067 | B2 | | 9/2015 | Miscioscia | |
| 9,174,075 | B2 | | 11/2015 | Cray | |
| 9,295,860 | B2 | | 3/2016 | Koban | |
| 10,029,132 | B2 | | 7/2018 | Cray | |
| 10,307,625 | B2 | | 6/2019 | Cray | |
| 10,737,127 | B2 | | 8/2020 | Johnston | |
| 10,792,525 | B2 | | 10/2020 | Cray | |
| 11,807,421 | B2 | | 11/2023 | Ouderkirk | |
| 2007/0284398 | A1 | | 12/2007 | Baughman | |
| 2007/0284399 | A1 | * | 12/2007 | Baughman | B65D 47/103 222/529 |
| 2010/0311001 | A1 | | 12/2010 | Helmsen | |
| 2013/0087581 | A1 | | 4/2013 | Jensen | |
| 2013/0206759 | A1 | | 8/2013 | Wurz | |
| 2018/0221693 | A1 | | 8/2018 | Cray | |
| 2022/0281658 | A1 | | 9/2022 | Angelozzi | |
| 2024/0382789 | A1 | | 11/2024 | Koneshon | |

FOREIGN PATENT DOCUMENTS

| | | | |
|---|---|---|---|
| DE | 149581 | C | 1/1902 |
| EP | 0620160 | A3 | 12/1994 |
| EP | 1923322 | B1 | 11/2010 |
| EP | 2812275 | A1 | 12/2014 |
| GB | 688531 | A | 3/1953 |
| GB | 688534 | A | 3/1953 |
| GB | 707414 | A | 4/1954 |
| GB | 764573 | A | 12/1956 |
| GB | 1277256 | A | 6/1972 |
| GB | 1349535 | A | 4/1974 |
| GB | 2076379 | B | 8/1985 |
| WO | 2011138325 | A1 | 11/2011 |
| WO | 2013117921 | A1 | 8/2013 |

* cited by examiner

RETRACTABLE SPOUT CLOSURE SYSTEM WITH FLAME MITIGATION

CROSS REFERENCE TO RELATED APPLICATIONS

This application is a continuation-in-part of international patent application serial number PCT/US2023/020958 (now published as WO2023/215451A1) filed on May 4, 2023 with the United States Patent and Trademark Office acting as the receiving office, and that application claims priority to the following U.S. provisional patent applications: 63/338,257 filed on May 4, 2022; 63/342,211 filed on May 16, 2022; and 63/351,965 filed on Jun. 14, 2022. Selected aspects of the latter two provisional applications have been adopted into this application, and all of the foregoing provisional applications are incorporated by reference herein.

TECHNICAL FIELD

The present invention relates generally to a disposable, pre-filled storage container for flammable fuels and liquids having a flashpoint below 60° C. (140° F.) an attachable closure having an integrally formed or permanently affixed flame mitigation device disposed within the outlet to minimize or prevent the potential of flame jetting or container rupture.

BACKGROUND

Portable fuel containers are widely used for the transportation, storage, and dispensing of fuels, fire starters, additives for internal combustion engines, and other flammable liquids (i.e., liquids having a flashpoint below 60° C. (140° F.)). Often, these liquids are sold in disposable—and sometimes reusable—pre-filled, containers. Owing to their flammability, numerous statutory and regulatory requirements are imposed on manufacturers and sellers of such containers.

For example, the United States' Consumer Products Safety Commission has adopted or endorsed numerous standards published by ASTM International, including F3429; F3326; F2874; F2517; and F852. One of the primary areas for concern in this regard is to provide for a flame mitigation device. These usually take the form of a physical insert that prevent propagation of flames into or out of the container.

The flash point is the minimum temperature at which a liquid forms a vapor above its surface in sufficient concentration that it can be ignited, and the lower the flash point, the more easily that liquid can ignite. Liquids having a flash point of less than 100° F. are designated as "flammable," while "combustible" liquids have a flashpoint at or above 100° F. Most existing and anticipated statutory/regulatory schemes seek to mitigate against the impact of sparks and flames by providing a barrier to prevent, suppress, or delay ignition of vapors inherent to all flammable and combustible liquids, and especially those confined in containers with a narrow neck or outlet.

U.S. Pat. Nos. 1,553,395; 1,816,323; 1,792,198; 2,247,734; 3,327,628; 4,483,461; 9,126,067; 9,174,075; 9,295,860; 10,029,132; 10,307,625; and 10,792,525 all describe various mechanisms to suppress, arrest, or mitigate flame and explosion events in containers and transportation vessels for flammable liquids and fluids. All of these patents are incorporated by reference herein as background for the design considerations, purposes, and challenges in this field. German publication DE149581A, Australian patent AU511081B, British publication GB707414A, and European patent EP2812275B1 are similarly informative.

In general, many (if not all) of these flame mitigation devices rely upon entraining fuel in small apertures of a cup or screen that is disposed within the container neck. The vapor pressure emitted by the entrained fuel is sufficient to prevent combustible ratios of air and fuel from existing at the container opening, or the construction of the cup or screen is such that flames are quenched before they can travel beyond the screen.

One drawback to many of these structures is that they must be permanently affixed to the container. However, if they are integrally formed with the container, filling the container can become problematic because fluid flow through such small apertures can be slow, and/or the apertures may become clogged.

Additionally, certain applications call for closures having integrated, selectively extendible spouts, but these type of spout/closure combinations present additional challenges for flame mitigation. With reference to the examples provided by United States patent publication 2022/0281658 and U.S. Pat. Nos. 7,988,007; 5,967,376; 4,295,583; 3,613,966; 3,040,938; and 2,561,596, these combination spout-closures are largely or completely made of resilient, flexible polymers to form the extending and retracting spout. Additionally, many of these previous designs were targeted for use on industrial drums, many of which rely on crimping or curling the metallic edge of the bung with a corresponding metallic ring that captures/holds the plastic spout. Further still, to the extent the plastic element(s) constituting the spout must travel through the container neck to allow for extension and retraction, it is not possible to rely on metallic elements affixed to the container (in addition to the aforementioned filling issue in the preceding paragraph).

In patent publication WO2023/215451A1, the inventor had previously proposed a number of flame mitigating closures. Generally, these closures relied upon a wire or plastic mesh spaced apart from the outlet of a dispensing closure. However, these proposals relied upon a rigid closure that must remain fixed in place.

Irrespective of the type of closure, popular sentiment and regulatory considerations both continue to push for higher and higher percentages of resins used in consumer products (i.e., at least 67% and up to 95% or even 100%) to be made from post-consumer resins (PCR) recycled from earlier products. Such PCR resins may include (but are not limited to) certain grades of thermoplastics. Ideally, a single type of PCR resin is employed so that the closure can be introduced into recycling programs without the need to disassemble and/or separate parts, even in situations where the entirety of the closure might be comprised of recyclable materials (e.g., a plastic closure with a metal component must undergo disassembly and removal/sorting of such component to ensure that the metal does not foul the plastic recovery/recycling chain).

In view of all of the foregoing, a container and closure combination that includes a selectively extendible spout having flame mitigation elements is needed. Such spouts must meet at least some (or, ideally, all) of the aforementioned statutory and/or regulatory requirements. Further, the assembly should be capable of attachment to existing container necks and made from cost effective and/or PCR-based materials.

SUMMARY OF INVENTION

In addition to the benefits noted above, aspects of the inventions contemplated herein are generally directed toward meeting various safety standards and/or legal/regulatory requirements in connection with flame mitigation and arresting or quenching ignited fumes or liquids from passing through an extendible spout affixed to the container neck, thereby creating risk of a broader fire or explosive event. Significantly, the use of a polymeric cylindrical guard snap-fitted within the traveling portion of the flexible/extendible spout and the comparative dimensional ratios and positioning of a mesh within the spout, relative to the selected components of the overall, appear to be determinative of the system's ability to meet the various requirements of a flame mitigation device as contemplated herein (whether in the form of ASTM test protocols or other criteria).

Specific reference is made to the appended claims, drawings, and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the invention may be better understood by reference to the detailed description taken in connection with the following illustrations. These appended drawings form part of this specification, and any information on/in the drawings is both literally encompassed (i.e., the actual stated values) and relatively encompassed (e.g., ratios for respective dimensions of parts). In the same manner, the relative positioning and relationship of the components as shown in these drawings, as well as their function, shape, dimensions, and appearance, may all further inform certain aspects of the invention as if fully rewritten herein. Unless otherwise stated, all dimensions in the drawings are with reference to inches, and any printed information on/in the drawings form part of this written disclosure. Because the drawings are provided at scale, dimensional information and comparative ratios may be inferred, extrapolated, or otherwise obtained from an individual image.

In the drawings and attachments, all of which are incorporated as part of this disclosure.

DETAILED DESCRIPTION

Figure 1:
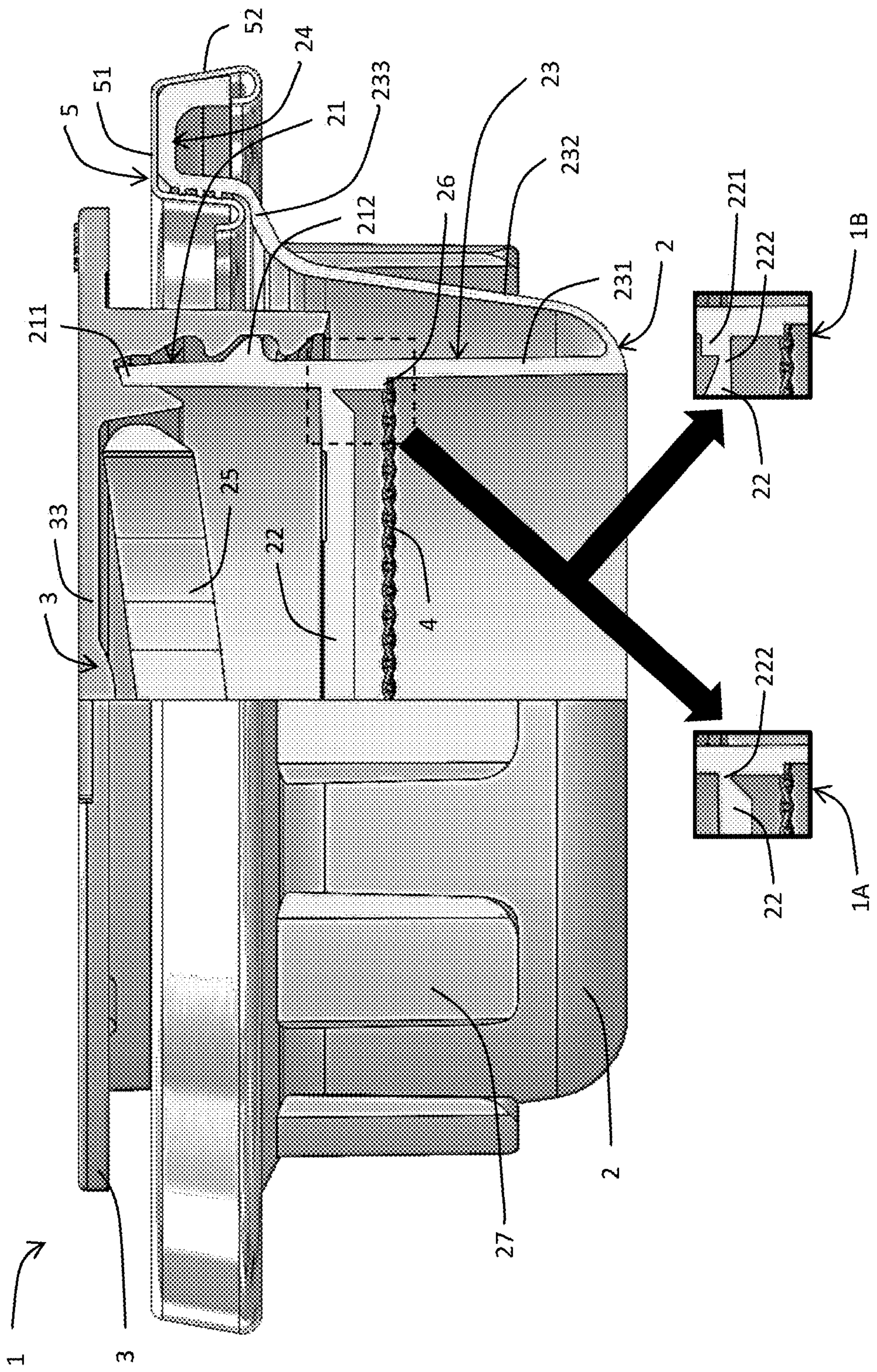
FIG. 1 is a dual side view, with the left side of the image shown in plan view and the right side of the image shown in diametrical cross sectional view, both showing a first aspect of the flame mitigation spout and cap in their assembled and retracted/compressed form according to a first aspect of the invention. The callouts 1A (as pictured in the main image of FIG. 1) and 1B (as an alternative arrangement) provide for two separate configurations of how the tamper evident panel may connect to the inner surface of the spout, as well as both highlighting the positioning of the mesh insert and its attachment point to the spout. The cylindrical guard is not present in FIG. 1 but, insofar as all of the components shown in FIG. 1 (as well as FIGS. 2-3) are common to the embodiment shown in FIGS. 6-12, the first aspect is easily adapted to accommodate such a cylindrical guard.
Figure 2:
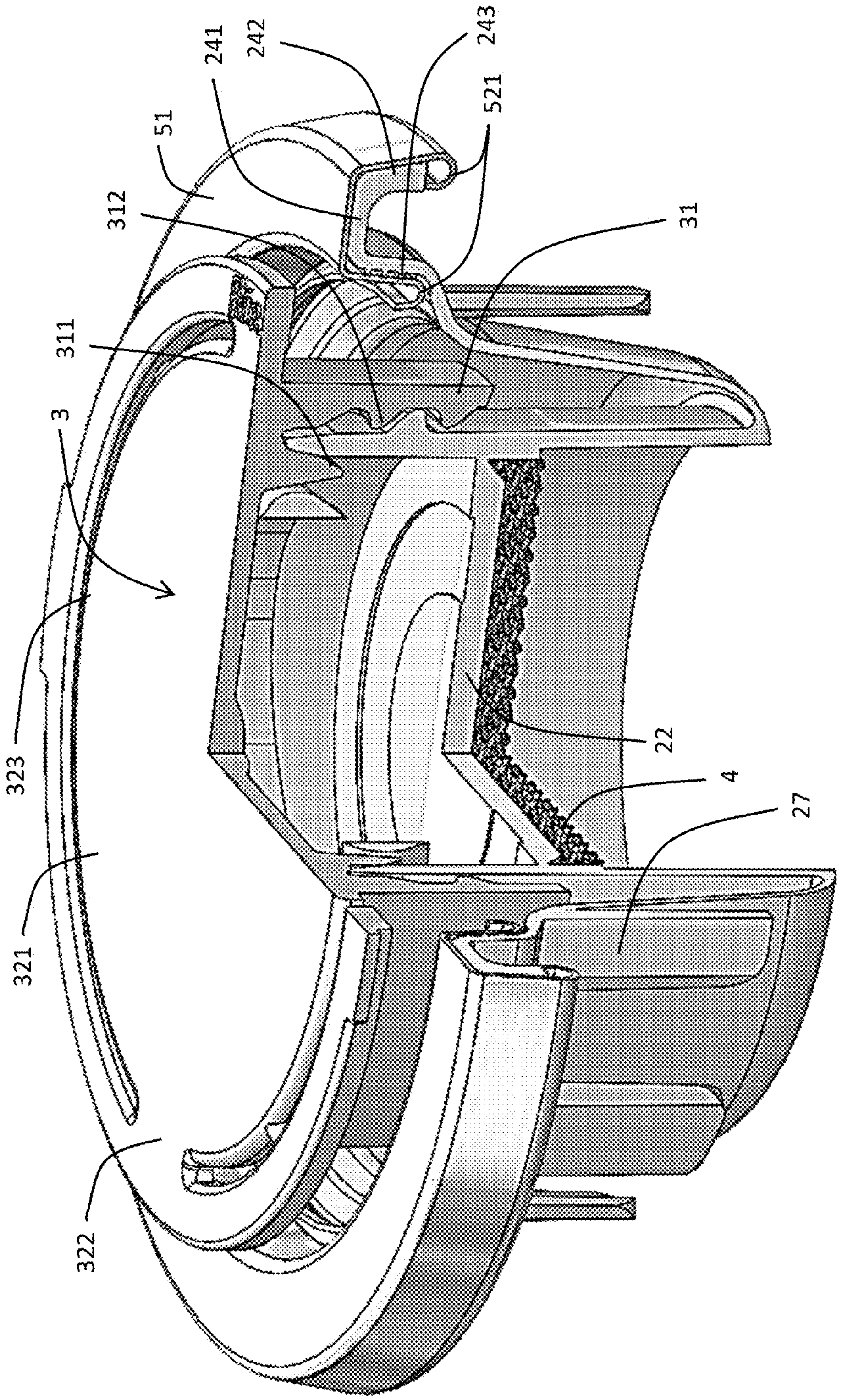
FIG. 2 is three dimensional top view, with a quarter portion shown in cross sectional view, of the spout and cap contemplated by FIG. 1.
Figure 3:
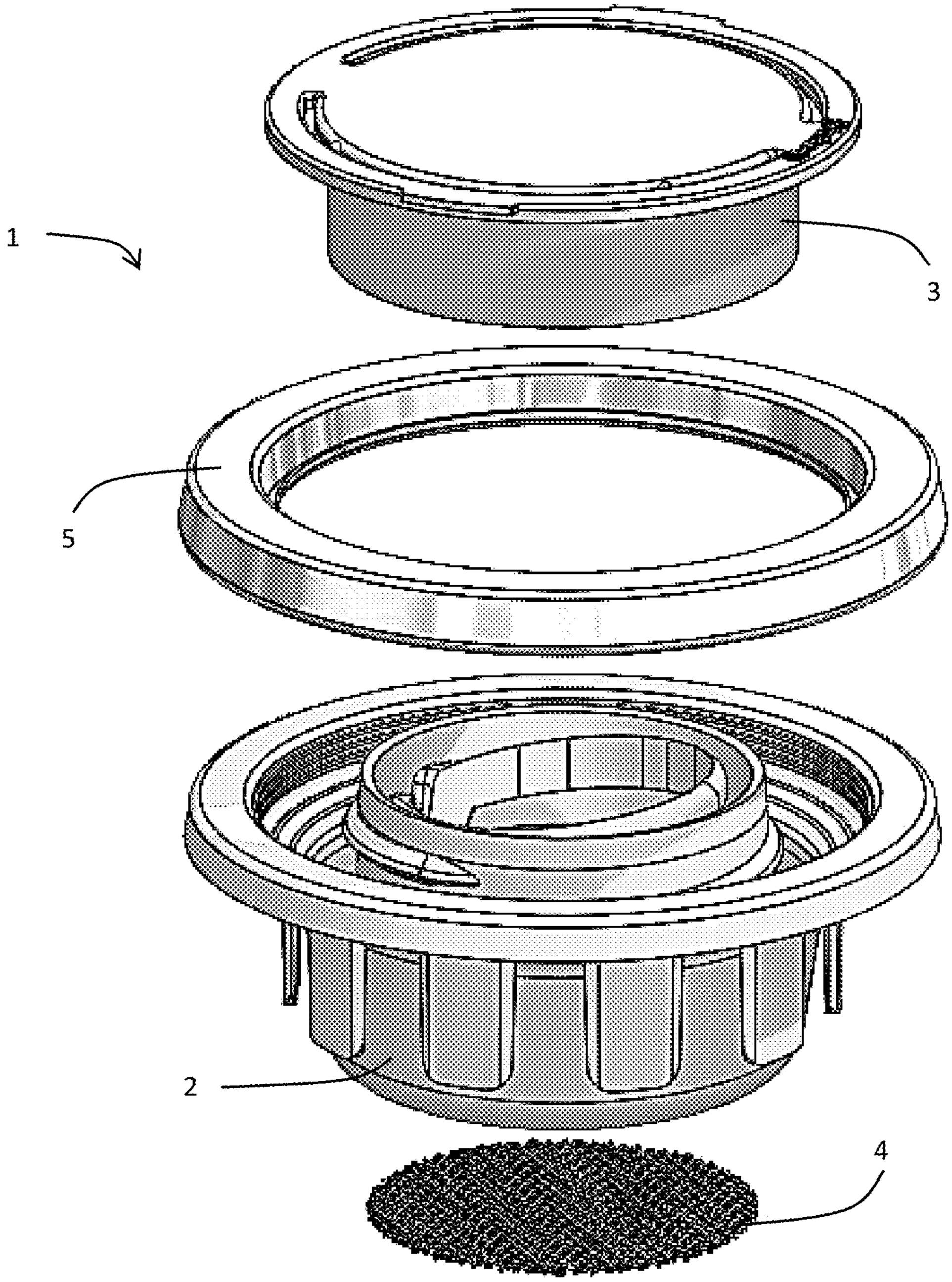
FIG. 3 is an exploded three dimensional top view, separate by individual components, of the spout and cap contemplated by FIG. 1.

Reference will now be made in detail to exemplary embodiments of the present invention, examples of which are illustrated in the accompanying drawings. It is to be understood that other embodiments may be utilized and structural and functional changes may be made without departing from the respective scope of the invention. As such, the following description is presented by way of illustration only and should not limit in any way the various alternatives and modifications that may be made to the illustrated embodiments and still be within the spirit and scope of the invention.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Understanding a number of the components possess hollow tubular and/or elongated cylindrical shapes, references to radial, transverse, or lateral directions are synonymous to the width (i.e., horizontal plane/axis) depicted in the drawings. Correspondingly, references to the axial direction comport with the height or vertical plane/axis in the drawings. Similarly, top, bottom, left, and right can all be oriented and discerned based upon the presentation of the images in the drawings (depending upon their portrait or landscape orientations).

Various aspects of a closure having a cap and an integral and selectively extendible spout with added flame suppression and/or mitigation features are contemplated. The container and closure combination may have any number of conventional features that are commonly encountered in this field, including but not limited to a screw fit arrangement between the cap and the closure to allow the closure to selectively removed and refitted. When fitted, the combination forms a watertight and/or hermetic seal.

In the Drawings, it will be understood that selected reference numerals may apply to multiple different embodiments, even if not all of the features depicted in an individual figure are completely and comprehensively labeled.

Flame mitigation system 1 includes a hollow tubular fitment member 2 that can be sealed by a removable cap 3. A mesh element or insert 4 is affixed along a comparatively rigid portion of lumen referred to as the spout 21. A flexing portion 23 of the lumen can be moved axially up or down, relative to a connecting ring 24, so as to create the extendible spout. A removable, tamper evident (insofar as its removal will provide evidence of previous use/tampering) panel 22 spans and seals a narrowed portion of the lumen above the mesh 4.

The top edge 211 of spout 21 can include an angled or slightly tapering terminal edge. Threads or other engagement features 212 on the outer surface of the spout 21 cooperate with threads or similar engagement features 312 found on the inner surface of the axial skirt 31 on cap 3.

On the inner surface of the spout 21, preferably at, slightly above, or slightly below the elevation of tamper evident panel 22, an extension ring 221 projects radially into the lumen to define inner diameter. Ring 221 may include strengthening supports (not shown) spaced apart circumferentially above or below the plane define by panel 22. Ring 221 may possess a discrete thickness/height extending inward and/or above at least one of the boundaries of the panel 22, so as to better distinguish these features. Without wishing to be bound by any particular theory of operation, ring 22 is believed to create an obstruction for flames that might otherwise propagate within the lumen. It also creates turbulence for fluid flow along the otherwise smooth surfaces of the inner facings of the lumen, which delays penetration through the mesh (by flame, when present, and by fluids passing along the lumen).

The ring 221 can also accommodate the integral formation or attachment of a tamper-evident panel 22 that spans and blocks the lumen. When formed integrally by way of an injection or other molding process, a thinned section 222 enables the easy disconnection of the panel 22 by pulling and/or twisting with the bail handle 25, which may be formed integrally with the panel/fitment. The main panel 22 (i.e., at the central-most portions) may be flat or conically shaped and, in any event, will have a greater thickness in comparison to the thinned section in order to create predictable break lines. In some aspects, the main panel 22 is at least twice as thick and may be up to ten times as thick as the thinned section 222 (which itself will fully encircle the main panel 22 along its periphery).

Also within the inner midsection of spout portion 21, an annular ledge 26 projects at a substantially orthogonal angle in comparison to the surface of the inner lumen of the spout 21, so as to impart a comparatively larger outer diameter beneath it in comparison to the top edge 211. Ledge 26 possesses a comparatively thinner wall section (relative to spout 21), so as it indicate the transition to the flexible portion 23 of the fitment 2. Ledge 26 also provides a planar surface to which the peripheral edges of the disk-shaped mesh insert 4 can be attached.

The mesh 4 may be heat staked, welded, or adhered to the fitment 2 along the bottom facing of the ledge 26. In second aspect involving the snap-fitting cylindrical guard 6, these processes may be eliminated so as to reduce cost and complexity.

Figure 4:
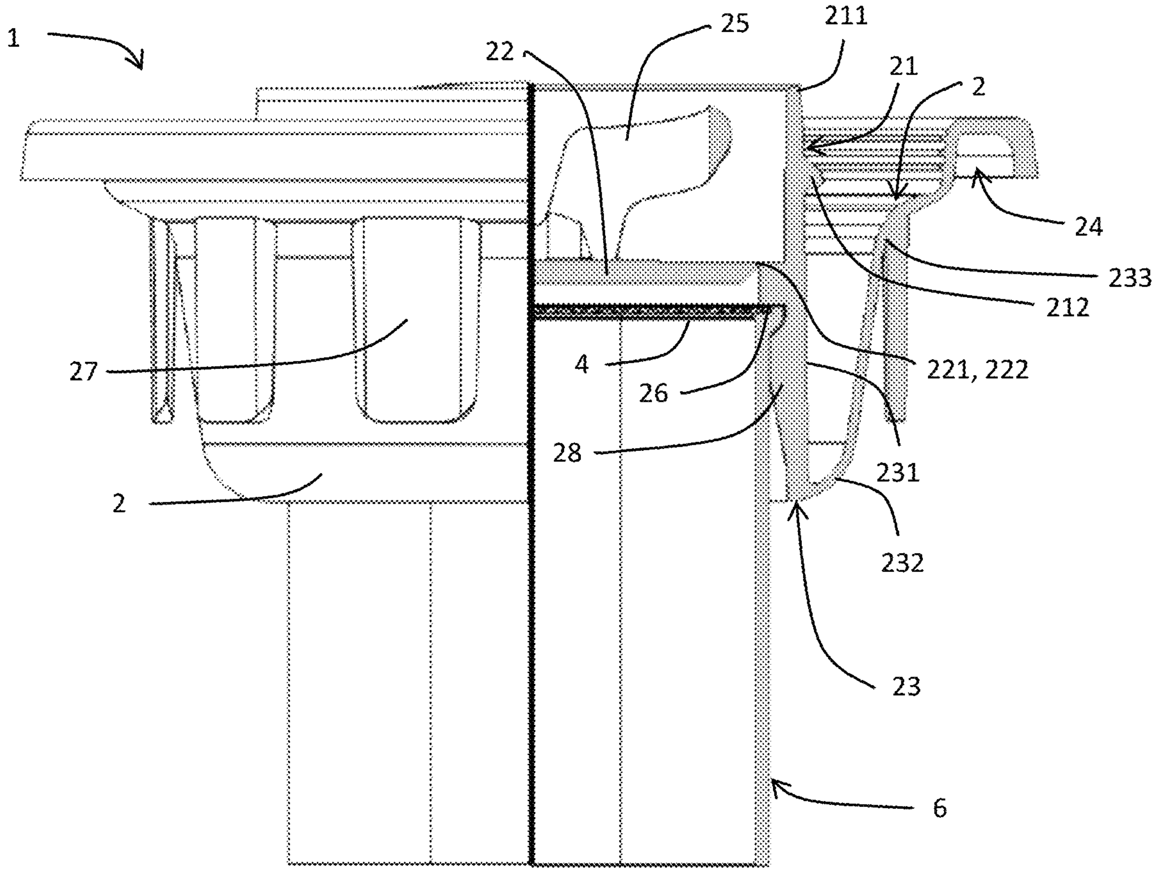
FIG. 4 is a dual side view that is essentially identical to that in FIG. 1, with the left side of the image shown in plan view and the right side of the image shown in diametrical cross sectional view, except that this view: i) omits the removable cap and the coupling ring, and ii) includes a second aspect of the flame mitigation spout and cap (in their assembled and retracted/compressed form) in which a cylindrical guard is affixed to the rigid portion of the spout via a series of engagement flanges, thereby capturing the mesh and eliminating the need for heat staking or other processes to affix the mesh to the horizontal ledge/fitment.

The elevations of the ring 222 and the ledge 26, both relative to the top edge 21, are is defined (respectively speaking) by axial heights C and D in FIG. 4. Similarly, owing to the change in wall thickness of the spout portion 21 and the flexible portion 23, the inner diameter B of the spout 21 is smaller than the inner diameter A of the flexible portion 23. The inventors have determined these comparative dimensions all play a role in imparting flame mitigation characteristics, as set forth in Table 1 below.

Figure 5A:
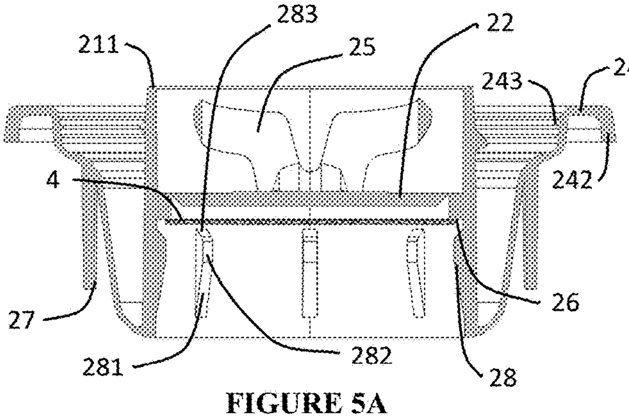
FIG. 5A is a cross sectional side view and FIG. 5B a bottom perspective view, both showing only the fitment and the mesh components of the second aspect shown in FIG. 4 (i.e., with the cylindrical guard and removable cap both omitted to highlight the number, size, shape, and positioning of the retention flanges).
Figure 5B:
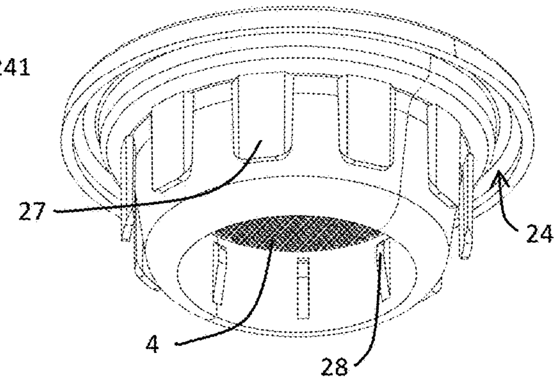
Figure 6:
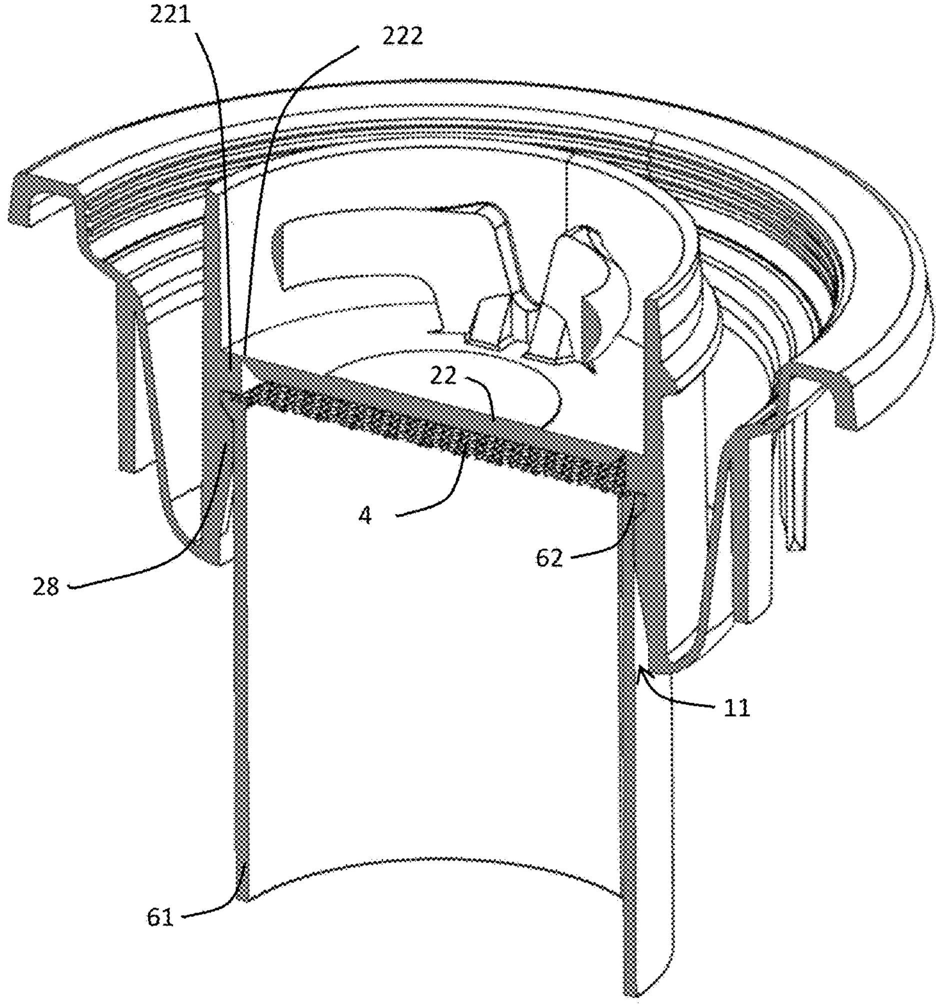
FIG. 6 is three dimensional top view, with a quarter portion shown in cross sectional view, of the spout and cap contemplated by FIG. 4.

The flexible portion 23 cooperates with the spout 21 to define the outlet/funnel in the closure 1 when the fitment is in its extended position (see FIG. 5) relative to the coupling ring 24 that remains captured on the container neck. When compressed/retracted (as in FIGS. 1-4), the flex portion 23 bends and concentrically receives the comparative rigid and straight-walled spout 21 (including the ledge 26 and mesh 4). In this manner, the flame mitigating mesh 4 does not experience the stresses exerted on the flexing portion 23 as the outlet is extended and/or retracted.

The flexible portion 23 includes a comparatively rigid, straight-wall section 231 oriented in the axial direction and connected directed to and extending down from the spout 21/ledge 26. Section 231 connects at an angle to a thinner, flexible section 232. Section 232 may flex and bend for storage purposes in the retracted position, as well as when the spout 21 travels from retracted to extended (and vice versa). A thicker, serpentine shaped section 233 transitions the flexing portion to the coupling portion/ring 24.

Integral, "anti-glug" appendages or flaps 27 extend axially downward concentrically around the spout 21 and flexing portion 23. Appendages 27 are spaced apart along a circumference of the thickened, serpentine connector section 233. In some aspects, the appendages 27 contribute to the thickness of section 233 (in comparison to section 232). When the fitment 2 is extended, the appendages 27 protrude into the inner volume of the container (which will be tilted or inverted for pouring/dispensing) defining the lower edge of the assembly 1, thereby providing anti-glug features.

The ring-like coupling portion 24 possesses a C-shape that will conform to the external coupling ring 5. Immediately adjacent to the serpentine section 233, an axially oriented, semi-flexible wall has one or a series of engagement ridges 243 protruding radially inward. A horizontally oriented panel 241 will conform to a corresponding panel 51 on the ring 5 to allow for compression and sealing to a container neck (not shown). At its outermost periphery, a thickened wall or skirt 242 is provided, with the wall having ridges 241 and skirt 242 defining a gap in which the terminal end of the container neck is received.

With reference to FIG. 4, selected aspects of the fitment 2 can be modified to accommodate a cylindrical guard 6. Without wishing to be bound by any theory, it is believed that the hollow inner lumen of cylindrical guard 6, whose inner diameter E2 along the main tube 61 will be offset and smaller in comparison to the inner diameter B at the removed panel 2/extension ring 221 create conditions similar to the difference between diameters A and B described herein and illustrated in FIGS. 9A and 9B. Additionally, the comparative axial length of travel for oxygen/flame trying to penetrate into the container through the mesh 4 would be extended by length E3, thereby providing a "flame shield" that maintains the integrity of the rigid spout 21 and flexible section 23 even when the fitment 2 is in its fully extended state (as seen in FIG. 10).

Guard 6 has a hollow cylindrical shape that will conform to the cross-sectional shape of the lumen in fitment 2 (e.g., circular). The main portion 61 of the tube has a substantially consistent diameter and wall thickness, with the bottom edge of the guard 6 configured so that it will remain below the elevation of the lower-most edge of the junction between the flexible portion 23/serpentine portion 233 and the coupling portion 24/inner wall having engagement features 243, although the appendages 27 preferably extend below the bottom of the guard to impart anti-glug capability. The main body 61 (and the entirety of guard 6, excepting the singular openings at the top and bottom of the tube) is made from a solid and impermeable element, without incorporating any apertures, mesh, or other through-holes (in contrast to the disclosure of U.S. Pat. No. 10,307,625).

The top end of the guard 6 includes a capturing or retention flange 62 that primarily protrude radially beyond the outer diameter E1. Flange 62 provides for a horizontally aligned nesting ledge 63 that captures and restrains the bottom facing periphery of the mesh 4 (with the top periphery in contact with the attachment ledge 26). A smaller annular extension 64 protrudes radially upward so as to define the boundary of the nesting ledge 63, while a small inner radial protrusion 65 can be provided. The top facing of the extension 64 may come into direct contact with the annular ledge 26, thereby providing for appropriate spacing between the nesting ledge 63 and the annular ledge 26 and preventing unwanted compression or deformity of the mesh element 4. As a further advantage, the capture of the mesh element within this spacing preclude the need to rely upon heat staking, welding, or the use of adhesives, all of which typically require additional manufacturing equipment, added process steps, cost, and complexity.

Figure 7:
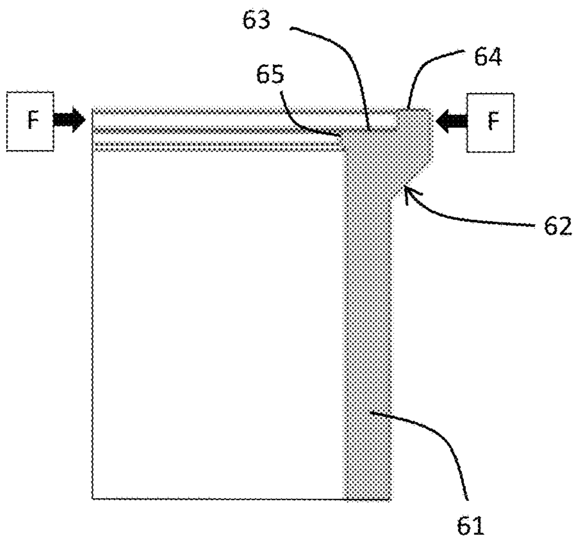
FIG. 7 is cross sectional side view of the top edge portion along side of the cylindrical guard contemplated by FIG. 4, illustrating the nesting ledge.
Figure 8:
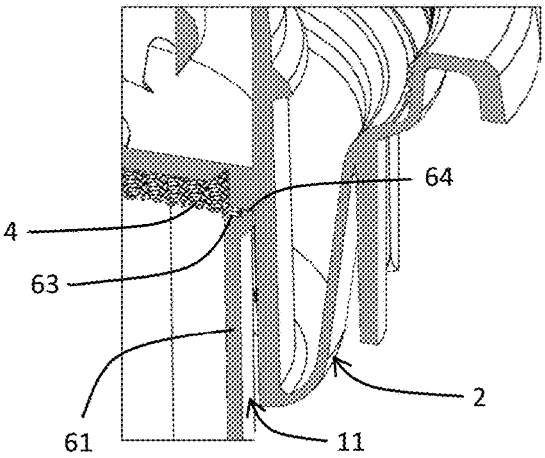
FIG. 8 is a three dimensional cross sectional view of the interface between the cylindrical guard, the fitment, and the mesh, but taken along a diameter does not bisect any of the retention flanges.

In order to secure guard 6 to the fitment 2 beneath the panel 22, a series of wedge-shaped retention flanges 28 are arranged around a circumference of the inner facing of the axially thinned portion 231. Flanges 28 will be spaced downwardly apart from the panel 22/extension ring 221 so as to accommodate the axial thickness of the mesh insert 4. As such, the flanges 28, nesting ledge 23, and the outer diameter of extension flange 62 will be aligned in or along radial plane F (also indicated as line F-F in FIG. 7).

The flanges 28 will have an overall axial height, with a tapering lower ramp 281 giving way to a main body portion 282 at which the flanges 28 attain their maximum radial intrusion into the lumen. The top facing 283 provides a snap-fitting engagement configured to receive and retain the capturing flange 62. The arrangement of the horizontal attachment ledge 26, the nesting ledge 63, and the annular extension 64 all cooperate to restrain and position the mesh 4, possibly without the need for heat staking, adhesives or other similar measures.

The use of flanges 28 will create a gap 11 between the outer surface of the main tube 61 and the inner surface of the flexible portion 23. However, at the upper interface between the fitment 2 and the guard 6, tight seals are formed to prevent the leakage or escape of fluids when the assembly 1 is dispensing fluid through the lumen/spout 21.

In order to retain the flexibility and mobility of the spout (as well as to minimize unnecessary materials' usage), a minimal number of flanges 28 should be employed. Further, the flanges 28 should be spaced apart evenly to insure the spout 21 extends reliable without creating unwanted stressed portions within its flexing walls. In a preferred aspect, between 4 to 10 flanges are provided, and with their inner facing constituting less than 15% of the total surface area along the circumference where the guard 6 is snap-fitted and held (i.e., in/beneath/adjacent to plane F). More preferably, 8 flanges account for between 10 to 12.5% of the circumference. In the same manner, the lower ramp 281 should be comparatively more elongate to allow the components to resilient flex and snap-fit into place during assembly.

Ring 5 is sized to overlay on the coupling portion 24. In addition to the conforming horizontal/sealing section 51, opposing ends 52 extend axially down on either side. Ends 52 conform to the wall with ridges 243 on an inner side and to the thickened axial skirt 242 on the outer side. Curled edges 521 (both preferably oriented in the same inward direction, so as to impart a J-shape) insure that the C-shaped ring 5 is retained to the fitment 2. The ring 5 could also be applied after the fitment 2/assembly 1 is seated in the container neck (not shown), so that at least the outer end 521 curls under and couples to the container. In other aspects, anti-back off ribs or other features well known within the industry can be employed to insure the assembly 1 remains fixed and functionally attached to the container neck. While not illustrated in FIG. 4, ring 5 can be implemented with aspects of the invention relying upon cylindrical guard 6.

A cap 3 is fastened to the fitment by way of threads 312 (attachable to corresponding threads on an outer facing of the spout 21). Cap 3 includes a top panel 33 and handle mechanism 32 formed around its periphery. Skirt 31 extends downward, with the aforementioned threads 312 formed on its inner or outer facing. A plug seal flange 311 extends axially down from the panel 33, with the skirt 31 and flange 311 spaced apart to receive and conform to the top edge 211. The inner diameter of the flange 311 is sufficient to accommodate and conceal the panel 22 and handle 25. While not illustrated in FIG. 4, cap 3 can be implemented with aspects of the invention relying upon cylindrical guard 6.

The handle 32 includes one or a pair of outer ring sections 321, spaced apart and connected to the main panel 33 by connecting bridge(s) 322. One or more grasping tabs 323 extend up and/or radially away from the ring(s) 321, so as to provide a surface by which the rings 321 can be bent upward. In some aspects, the rings 321 include frangible connections provided along the circumference of the panel 33 for tamper evidence.

The mesh element 4 may be formed of intersecting wires or crossbars, which necessarily define apertures along the entire planar facing of the mesh 4. Without wishing to be bound by any theory of operation, the solid crossbars impede the flow of fluid (and particularly volatile vapors) by creating turbulence and obstructions relative to the propagation of flame through that facing. Additionally or alternatively, the apertures may retain liquid, owing to surface tension/adhesion and Van Der Waals forces. The presence of such liquid could alter the concentration of volatile vapor around the mesh 4, thereby acting as an impediment to creation or propagation of flame through the mesh 4.

In one aspect, two sets of parallel metal wires are used to created the mesh. Each wire in each set has a serpentine shape, so that it regularly bends at a regular, alternating angle so as to allow the two sets of wires to be intertwined. The wires should have a comparative diameter/thickness of 9 units (+/−2) in comparison to the 26 unit (+/−2) length of the square apertures. When the sets of wires are intermeshed, the total thickness (from top planar surface to bottom planar surface) is about 18 units (+/−2).

The peripheral shape of the mesh element 4 matches the cross sectional shape of the lumen in the fitment 2 at the ledge 26. Preferably, the shape will be circular or oval, with the diameter/width of the mesh 4 exceeding the inner diameter B (but necessarily smaller than the inner diameter A).

When the mesh is made of metal or materials sufficiently higher in softening/melting point as compared to the materials of the closure 2 or insert 6, ultrasonic welding or heat-staking operations can be employed to couple the mesh 4 accordingly. Heat-staking involves the localized application of heat around the periphery so as to melt or soften the ledge 26 (or inner facing of the fitment 2, preferably within the spout 21), with the mesh 4 pressed and embedded therein. Upon cooling, the mesh 4 becomes coupled/attached with sufficient strength to withstand expected testing procedures (e.g., any of the aforementioned ASTM protocols from the background section above).

As an alternative, mesh insert 4 could be formed by polymeric molding. Here, the cross bars (i.e., wires) and apertures are likely to have larger dimensions in comparison to the metal form, so as to accommodate the molding process. In such aspects, the mesh 4 could be formed as a snap-fitting element received in a groove or retention bead at or adjacent to the ledge 26. Here, a series of vent apertures (anywhere from 2-8) could be provided in intervals along the periphery of the element to allow for proper flow of fluids, and particularly make-up air, so as to minimize unwanted pressure differentials during pouring. The vent apertures would have a substantially larger open surface area in comparison to the apertures within the mesh itself.

The inventors discovered the relative dimensions and axial elevation of the mesh 4 impact its flame mitigation properties relative to the dimensions of the fitment 2. Specifically, the distance/height D from mesh 4 to the top 211 of spout 21, along with the distance/height C of the panel 22 (which, either by virtue of extension ring 221 or the remnants of thinned connector 222 protruding inward as a de facto ring 221 after panel is removed), will influence the ability of the system 1 to pass the aforementioned ASTM tests of interest, with the "stepped difference" in diameter along the lumen/flow path believed to be particular advantageous. As such (and in addition to the other dimensional relationships inherent to the Figures shown herein), the dimensions, ranges, and ratios set forth in Tables 1-3 are preferred aspects of the inventive system:

TABLE 1A

Figure 9A:
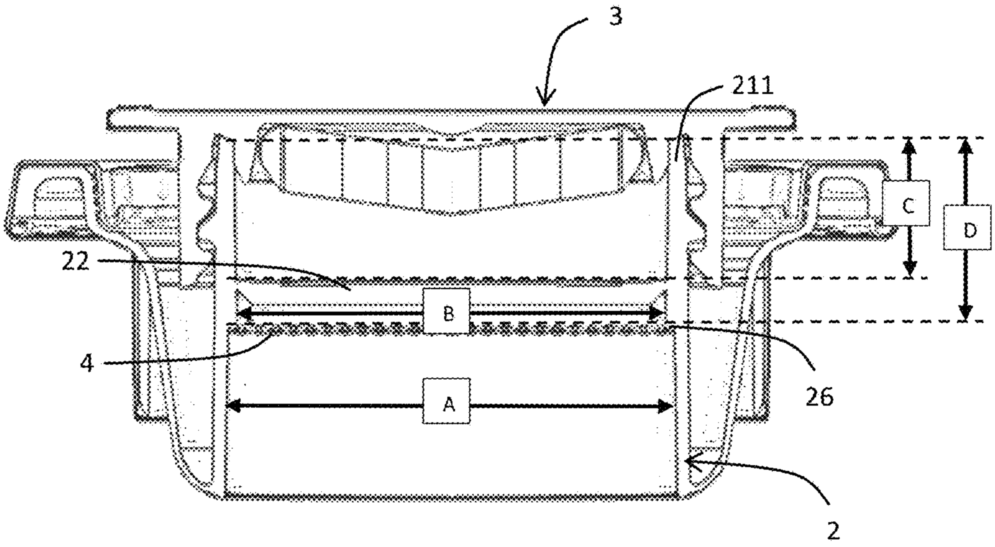
FIGS. 9A and 9B are a diametrical cross sectional views of the spout and cap contemplated by FIGS. 1 and 4 respectively speaking, with specific dimensions (e.g., diameter, axial elevation/height, etc.) indicated by the various arrows.
Figure 10:
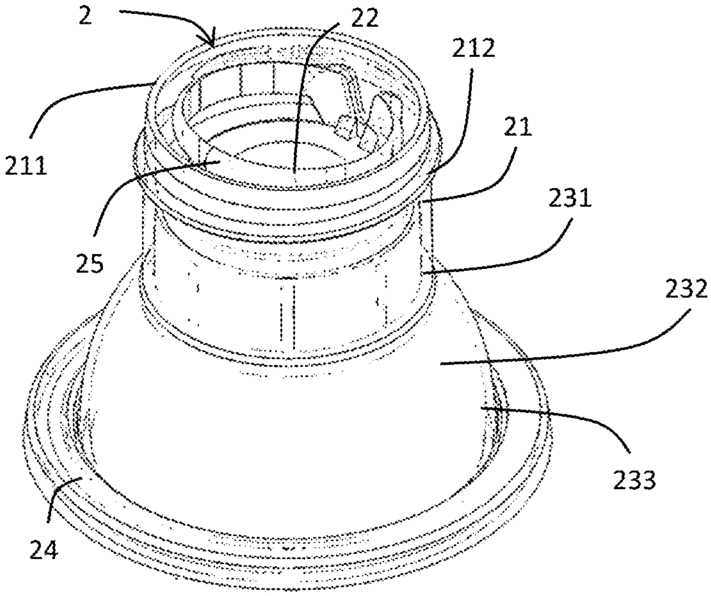
FIG. 10 is an isolated, three dimensional top view of the fitment component contemplated by FIG. 1 or 6, excepting that the spout has been moved into its fully extended position.

Dimensions of Closure, FIG. 9A

| Drawing Ref. # | Description | Min. | Max. | Preferred |
|---|---|---|---|---|
| A | Inner diameter of axial flex portion | 1.230 | 1.505 | 1.370 |
| B | Inner diameter above ledge | 1.090 | 1.330 | 1.210 |
| C | Axial height of tamper evident panel | 0.425 | 0.520 | 0.470 |
| D | Axial height of ledge/mesh | 0.540 | 0.660 | 0.600 |

TABLE 1B

Figure 9B:
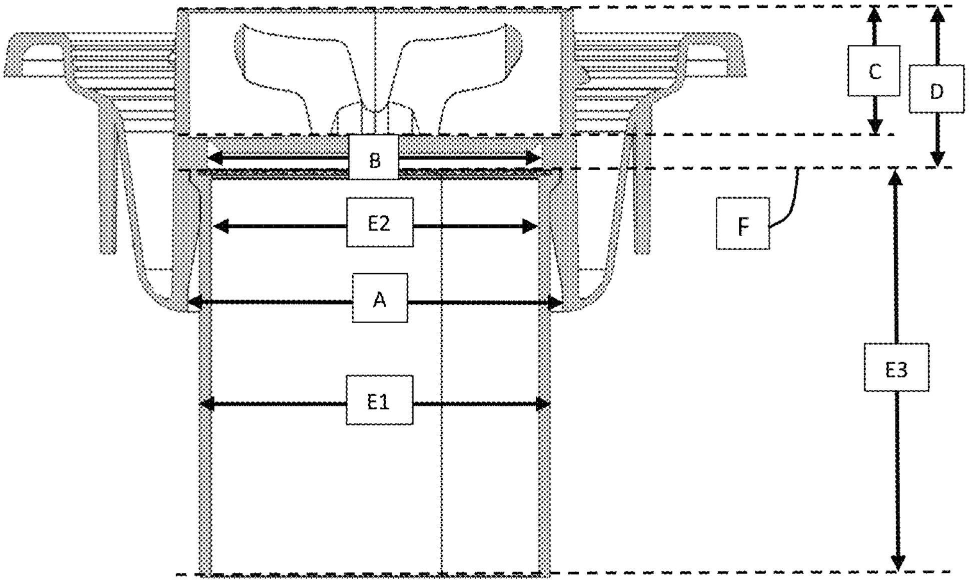

Dimensions of Closure, FIG. 9B

| Drawing Ref. # | Description | Min. | Max. | Preferred |
|---|---|---|---|---|
| A | Inner diameter of axial flex portion | 31.50 | 38.50 | 35.00 |
| B | Inner diameter above ledge | 28.17 | 34.43 | 31.30 |
| C | Axial height of tamper evident panel | 11.57 | 14.14 | 12.85 |
| D | Axial height of ledge/mesh | 14.22 | 17.38 | 15.80 |
| E1 | Outer diameter main tube of guard | 29.52 | 36.08 | 32.80 |
| E2 | Inner diameter main tube of guard | 27.63 | 33.77 | 30.70 |
| E3 | Axial height of guard | 34.02 | 41.58 | 37.80 |
| F* | Inner diameter along nesting ledge | 29.70 | 36.30 | 33.00 |
| F* | Outer diameter of capturing flange | 31.05 | 37.95 | 34.50 |
| n/a | Axial height of radial protrusion | 0.270 | 0.330 | 0.300 |

TABLE 2

Exemplary ratios, with reference to Table 1

| Relationship | Min. | Max. | Preferred Range |
|---|---|---|---|
| A/B | 1.005 | 1.300 | 1.118 to 1.132 |
| A/C | 2.500 | 3.500 | 2.724 to 2.915 |
| A/D | 2.000 | 2.500 | 2.215 to 2.283 |
| B/E2 | 1.001 | 1.050 | 1.020 |
| E2/E3 | 0.731 | 0.893 | 0.812 |
| D/E3 | 0.376 | 0.460 | 0.418 |

TABLE 3

Dimensions of Mesh (Metal and Plastic)

| Type | Description | Min. | Max. | Preferred |
|---|---|---|---|---|
| Metal | Wire size | 0.007 | 0.011 | 0.009 |
| Metal | Opening (aperture) size | 0.024 | 0.028 | 0.026 |
| Metal | Total thickness (woven) | 0.016 | 0.020 | 0.018 |

The foregoing dimensions in Tables 1A, 1B, and 3 are provided in nominal units, so as to allow for scaling the assembly 1 to attach to any number of container necks with differing dimensions (i.e., inner and outer diameters). While specific and significant ratios are identified for the first and second aspects in Table 2, it will be understood that other similar relationships based on the information in Tables 1A and 1B can be discerned. By way of example instead of limitation, because the inventors have found the inner diameter and axial travel distance of the flow path at selected points (i.e., the lumen as defined by the inner facings of the rigid spout, the extension ring, and/or the lower extremities of either the flexible portion or the cylindrical guard) seem to be particularly relevant to flame mitigation, additional relationships and ratios can be created by the reported values, particularly in Table 1B.

Whereas the first aspect relies upon axial spacing of the mesh element and the extension ring in combination with an increased inner diameter between the extension ring and the flexible/axially aligned portion of the fitment, the flame guard aspect relies upon the comparative axial distance from the outlet to the mesh vs. the mesh to the bottom edge of the main body of the cylindrical guard in combination with a decrease in inner diameter from the extension ring/rigid spout and main body of the guard. In each instance, the specific positioning of the mesh and the change in lumen diameter are believed to be helpful to the flame-mitigating properties of the assembly. As noted above, it is also believed that the gap between the guard and the thinned flexible section (as well as the rigid spout) help to localize any deleterious effect if flames were to penetrate and travel downward beyond the mesh. In any event, the most important feature of all aspects are their ability to pass the salient flame mitigation tests, and discrete embodiments of the invention specifically contemplate a unique ability to meet/pass tests F3429; F3326; F2874; F2517; and/or F852, all as published by ASTM International.

All components should be made of materials having sufficient flexibility and structural integrity, as well as a chemically inert nature. The materials should also be selected for workability, cost, and weight. Common polymers amenable to injection molding, extrusion, or other common forming processes should have particular utility for forming the closure fitment/tamper evident panel as a single piece (as well as the cap and, when used, the mesh insert as separate pieces). Polymers, metals, alloys, and other composites may be used in place of or in addition to more conventional container materials, so long as the neck finish cooperates with the size and shape of fitment 2.

Certain grades of polypropylene and polyethylene are particularly advantageous, especially in view of the absence of any thermosetting resins, elastomeric polymer blends, and other chemically distinct polymers or copolymers (in comparison to the other components of the dispensing pump). Notably, high density polyethylene (i.e., having a density of greater than 0.940 g/cm$^3$) may provide different characteristics in comparison to lower density polyethylene types (e.g., medium density at 0.925 to 0.940 g/cm$^3$ and/or lower density at 0.880 to 0.925 g/cm$^3$), as would specialized blends or copolymers capable of cross-linking for greater stiffness.

Polymeric materials should be selected for components other than the mesh based upon their ability to be molded (for manufacturing purposes), as well as cost and availability. Fluorination and/or irradiation of selected polymers/components may provide still more degrees of freedom in terms of materials selection and/or to impart desired qualities.

The design of interfaces and attaching/coupling components (i.e., retaining the system to the closure, as well as the connections of the discrete elements of the system itself) should all be sufficient to withstand at least fifteen pounds of force, whether exerted from the top or the bottom of the closure lumen. Designs should also account for flame exposure times should exceed thirty seconds with a two inch flame without failure. In these regards, the illustrated embodiments are capable of meeting these criteria, while allowing for scale-up or scale-down depending upon the container neck size. By way of example rather than limitation, exemplary containers should possess a neck size of 28 mm to 38 mm, although larger and smaller configurations are possible.

In view of the foregoing, a system and closure for mitigating propagation of flames is contemplated. The system can be configured to attach to the neck of a container, preferably being captured on the top edge of the opening of the container neck. This system/closure nominally includes a fitment, defining a lumen terminating in an outlet at a top edge of the fitment, having: i) a flexible section interposed between a rigid spout section and a coupling edge, ii) a circumferential horizontal ledge formed along an inner surface of the lumen where the flexible section joins the rigid spout, iv) a removable, tamper evident panel sealing the lumen and positioned above the horizontal ledge, and wherein the flexible section includes an axially aligned portion, connected to the rigid spout at a horizontal ledge, having a flexible section inner diameter that is greater than an inner diameter of the rigid spout; a removable cap detachably affixed to the rigid spout so as to conceal the tamper evident panel and selectively seal the outlet; a coupling ring secured over a top portion of the coupling edge; a flame mitigating mesh element coupled to the rigid spout along an inner-facing ledge, wherein the mesh element is spaced apart from the top edge at an mesh axial distance; wherein, when the tamper evident panel is removed so that fluid may be dispensed through the lumen, a ring section protrudes radially inward so that the ring section is spaced apart from the top edge at a ring axial distance; and wherein at least one of the following dimensional ratios applies: i) the flexible section inner diameter to the inner diameter of the rigid spout is between 1.005 and 1.300, ii) the flexible section inner diameter to the ring axial height is between 2.500 and 3.500, and iii) the flexible section inner diameter to the mesh axial height is between 2.000 and 2.500. Additional aspects may include any combination or permutation of the following:

- wherein at least two or all three dimensional ratios are fulfilled;
- wherein the flexible section inner diameter to the inner diameter of the rigid spout is between 1.118 and 1.132, the flexible section inner diameter to the ring axial height is between 2.724 and 2.915, and iii) the flexible section inner diameter to the mesh axial height is 2.215 and 2.283;
- wherein the mesh element consists of a wire mesh heat-staked directly to the horizontal ledge;
- wherein the coupling ring has a C-shape with opposing terminal edges each having a J-shape;
- wherein the flexible section includes a serpentine portion positioned adjacent to the coupling edge with a plurality of axial appendages extending downward from the serpentine portion to concentrically enclose the rigid spout when the fitment is in a retracted position;
- wherein the mesh element comprises woven metallic wires in which a first series of parallel wire strands are aligned in a first direction that intersect with a second series of parallel wired strands so that interstices between the first and second series of wires define the apertures; and
- wherein the removable cap includes a top panel with a handle attached along a periphery of the top panel.

In a complimentary aspect relying upon the cylindrical guard or flame shield, the system includes a fitment, partially defining an upper portion of a lumen that terminates in an outlet positioned at a top edge of the fitment, having: i) a flexible section interposed between a rigid spout section and a peripheral coupling edge and wherein the rigid spout section includes the upper portion of the lumen and the outlet, ii) a circumferential ledge in an inner surface of the lumen where the flexible section joins the rigid spout, iv) a removable, tamper evident panel sealing the lumen above the horizontal ledge, and v) a plurality of retention flanges protruding radially inward from an inner facing of the flexible section within a common spatial plane oriented parallel to and below the horizontal ledge; a removable cap detachably affixed to the rigid spout so as to conceal the tamper evident panel; a coupling ring secured to the coupling edge; a flame mitigating mesh element spanning the lumen and spaced apart from the top edge at an mesh axial distance; a cylindrical guard, snap-fitted to the fitment so as to capture the mesh element against the circumferential ledge, having: i) a hollow tubular main body with an guard inner diameter, ii) a capturing flange protruding radially outward from a top end of the main body, and iii) a guard axial distance defining a lower portion of the lumen and extending from the top end of the main body to an opening at a bottom end of the main body, and wherein the capturing flange is configured to cooperate with the retention flanges; wherein, when the tamper evident panel is removed so that fluid may be dispensed through the lumen, a ring section protrudes radially inward so that the ring section is spaced apart from the top edge at a ring axial distance and possesses a ring inner diameter; and wherein at least one of the following dimensional ratios applies: i) the ring inner diameter to guard inner diameter is between 1.001 and 1.050, ii) the guard inner diameter to guard axial height is between 0.731 and 0.893, and iii) the mesh axial distance to the guard axial distance is between 0.376 and 0.460. Additional aspects may include any combination or permutation of the following:

- wherein at least two of the dimensional ratios are fulfilled;
- wherein all three of the dimensional ratios are fulfilled;
- wherein all three of the dimensional ratios are fulfilled as follows: i) the ring inner diameter to guard inner diameter is 1.020, ii) the guard inner diameter to guard axial height is 0.812, and iii) the mesh axial distance to the guard axial distance is 0.418;
- wherein the capturing flange includes at least one of an inwardly directed nesting ledge and an annular axial extension; and
- wherein the mesh element is seated in the capturing flange such that no adhesives, welding, and/or heat staking is required.

References to coupling in this disclosure are to be understood as encompassing any of the conventional means used in this field. This may take the form of snap- or force fitting of components, although threaded connections, bead-and-groove, and bayonet-style/slot-and-flange assemblies could be employed. Adhesive and fasteners could also be used, although such components must be judiciously selected so as to retain the recyclable nature of the assembly.

In the same manner, engagement may involve coupling or an abutting relationship. These terms, as well as any implicit or explicit reference to coupling, will should be considered in the context in which it is used, and any perceived ambiguity can potentially be resolved by referring to the drawings.

Although the present embodiments have been illustrated in the accompanying drawings and described in the foregoing detailed description, it is to be understood that the invention is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof.

What is claimed is:

1. A system for mitigating propagation of flames through an extendible/retractable dispensing closure configured to attach to a container neck, the system comprising:

- a fitment, partially defining an upper portion of a lumen that terminates in an outlet positioned at a top edge of the fitment, having: i) a flexible section interposed between a rigid spout section and a peripheral coupling edge and wherein the rigid spout section includes the upper portion of the lumen and the outlet, ii) a circumferential ledge in an inner surface of the lumen where the flexible section joins the rigid spout, iv) a removable, tamper evident panel sealing the lumen above the horizontal ledge, and v) a plurality of retention flanges protruding radially inward from an inner facing of the flexible section within a common spatial plane oriented parallel to and below the horizontal ledge;
- a removable cap detachably affixed to the rigid spout so as to conceal the tamper evident panel;
- a coupling ring secured to the coupling edge;
- a flame mitigating mesh element spanning the lumen and spaced apart from the top edge at an mesh axial distance;
- a cylindrical guard, snap-fitted to the fitment so as to capture the mesh element against the circumferential ledge, having: i) a hollow tubular main body with an guard inner diameter, ii) a capturing flange protruding radially outward from a top end of the main body, and iii) a guard axial distance defining a lower portion of the lumen and extending from the top end of the main body to an opening at a bottom end of the main body, and wherein the capturing flange is configured to cooperate with the retention flanges;
- wherein, when the tamper evident panel is removed so that fluid may be dispensed through the lumen, a ring section protrudes radially inward so that the ring section is spaced apart from the top edge at a ring axial distance and possesses a ring inner diameter; and
- wherein at least one of the following dimensional ratios applies: i) the ring inner diameter to guard inner diameter is between 1.001 and 1.050, ii) the guard inner diameter to guard axial height is between 0.731 and 0.893, and iii) the mesh axial distance to the guard axial distance is between 0.376 and 0.460.

2. The system according to claim 1 wherein at least two of the dimensional ratios are fulfilled.

3. The system according to claim 1 wherein all three of the dimensional ratios are fulfilled.

4. The system according to claim 3 wherein all three of the dimensional ratios are fulfilled as follows: i) the ring inner diameter to guard inner diameter is 1.020, ii) the guard inner diameter to guard axial height is 0.812, and iii) the mesh axial distance to the guard axial distance is 0.418.

5. The system according to claim 1 wherein the capturing flange includes at least one of an inwardly directed nesting ledge and an annular axial extension.

6. The system according to claim 1 wherein the mesh element is seated in the capturing flange such that no adhesives, welding, and/or heat staking is required.

7. A system for mitigating propagation of flames through an extendible/retractable dispensing closure configured to attach to a container neck, the system comprising:

- a fitment, defining a lumen terminating in an outlet at a top edge of the fitment, having: i) a flexible section interposed between a rigid spout section and a coupling edge, ii) a circumferential horizontal ledge formed along an inner surface of the lumen where the flexible section joins the rigid spout, iv) a removable, tamper evident panel sealing the lumen and positioned above the horizontal ledge, and wherein the flexible section includes an axially aligned portion, connected to the rigid spout at a horizontal ledge, having a flexible section inner diameter that is greater than an inner diameter of the rigid spout;
- a removable cap detachably affixed to the rigid spout so as to conceal the tamper evident panel and selectively seal the outlet;
- a coupling ring secured over a top portion of the coupling edge;

a flame mitigating mesh element coupled to the rigid spout along an inner-facing ledge, wherein the mesh element is spaced apart from the top edge at an mesh axial distance;

wherein, when the tamper evident panel is removed so that fluid may be dispensed through the lumen, a ring section protrudes radially inward so that the ring section is spaced apart from the top edge at a ring axial distance; and wherein at least one of the following dimensional ratios applies: i) the flexible section inner diameter to the inner diameter of the rigid spout is between 1.005 and 1.300, ii) the flexible section inner diameter to the ring axial height is between 2.500 and 3.500, and iii) the flexible section inner diameter to the mesh axial height is between 2.000 and 2.500.

8. The system according to claim 7 wherein at least two of the dimensional ratios are fulfilled.

9. The system according to claim 7 wherein all three the dimensional ratios are fulfilled.

10. The system according to claim 9 wherein the dimensional ratio are all fulfilled as follows: i) flexible section inner diameter to the inner diameter of the rigid spout is between 1.118 and 1.132, ii) the flexible section inner diameter to the ring axial height is between 2.724 and 2.915, and iii) the flexible section inner diameter to the mesh axial height is between 2.215 and 2.283.

11. The system according to claim 7 wherein the mesh element consists of a wire mesh heat-staked directly to the horizontal ledge.

12. The system according to claim 7 wherein the coupling ring has a C-shape with opposing terminal edges each having a J-shape.

13. The system according to claim 7 wherein the flexible section includes a serpentine portion positioned adjacent to the coupling edge with a plurality of axial appendages extending downward from the serpentine portion to concentrically enclose the rigid spout when the fitment is in a retracted position.

14. The system according to claim 7 wherein the mesh element comprises woven metallic wires in which a first series of parallel wire strands are aligned in a first direction that intersect with a second series of parallel wired strands so that interstices between the first and second series of wires define the apertures.

15. The system according to claim 7 wherein the removable cap includes a top panel with a handle attached along a periphery of the top panel.

* * * * *